United States Patent [19]

Hamon

[11] 4,271,349
[45] Jun. 2, 1981

[54] WATER HEATER

[75] Inventor: François H. J. Hamon, Alencon, France

[73] Assignee: Moulinex, Societe Anonyme, Bagnolet, France

[21] Appl. No.: 45,328

[22] Filed: Jun. 4, 1979

[30] Foreign Application Priority Data

Jun. 9, 1978 [FR] France .................. 78 17259

[51] Int. Cl.³ ............................. F24H 1/16
[52] U.S. Cl. .................. 219/283; 219/302; 99/288
[58] Field of Search ........... 219/302, 283, 305, 296, 219/297, 298, 299; 99/288

[56] References Cited

U.S. PATENT DOCUMENTS

| 2,421,562 | 6/1947 | Hynes | 219/305 |
| 3,523,576 | 8/1970 | Gibson et al. | 219/302 |
| 3,902,408 | 9/1975 | Fuhner | 219/302 |

FOREIGN PATENT DOCUMENTS

| 7322195 | 1/1975 | France . |
| 7336902 | 5/1975 | France . |
| 7443407 | 7/1976 | France . |
| 5379 | 7/1892 | Switzerland . |

Primary Examiner—B. A. Reynolds
Assistant Examiner—Bernard Roskoski
Attorney, Agent, or Firm—Young & Thompson

[57] ABSTRACT

A water heater for a domestic coffee maker comprises a hot plate which is heated by an electrical resistance heater. A cavity is formed within the hot plate. The cavity extends substantially parallel to the top and bottom surfaces of the plate and has a closed end within the plate and an open end in the peripheral surface of the plate. The cavity is divided transversely by a partition which defines together with the internal walls of the cavity, a substantially U-shaped water circulation passage within the cavity. Water flowing through the U-shaped passage is thus heated by the heater.

3 Claims, 5 Drawing Figures

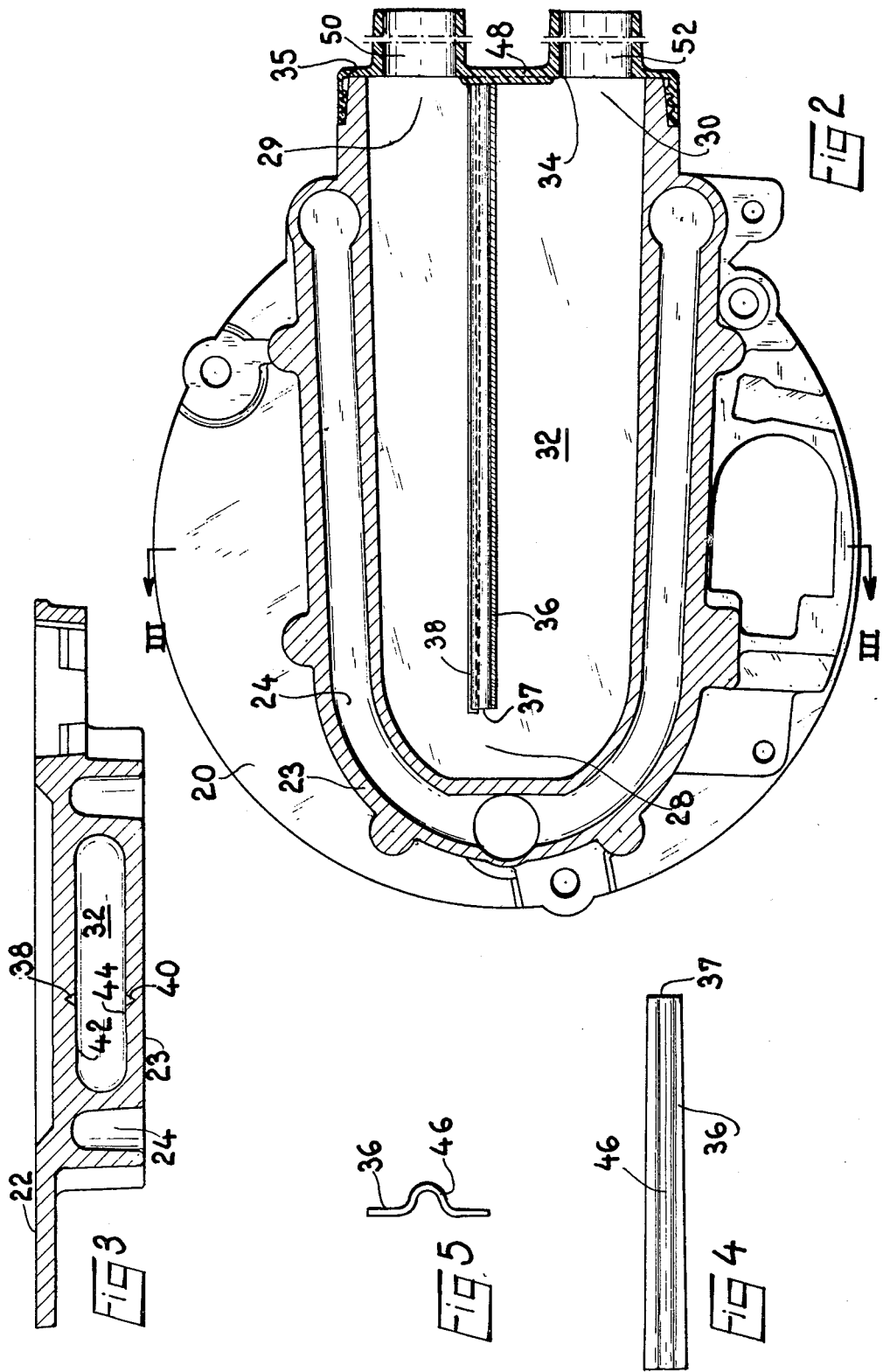

WATER HEATER

BACKGROUND TO THE INVENTION

The present invention relates to water heaters, and in particular to water heaters which are intended to be incorporated in domestic coffee makers.

Water heaters for domestic coffee makers are known which comprise a hot plate which is heated by an electrical resistance and a water circulation passage formed within the hot plate and extending from a cold water inlet to a hot water outlet. In the known heaters the water circulation passage consists of a channel made in one face of the plate and closed by a separate cover. It is necessary to insert a gasket of large diameter at the periphery of the channel between the plate and the cover to seal the channel. A coffee maker equipped with a water heater of this kind has been described, for example, in French Certificate of Utility No. 2,296,394.

After a coffee maker of this kind has been used for a certain time, the gasket generally ages and peripheral leaks consequently occur which render the apparatus unusable and can even cause electrical short circuits.

It is an object of the present invention to provide a water heater for a domestic coffee maker which reduces the disadvantages of the known water heaters. It is also an object of the invention to provide a water heater which is of simple and economical construction permitting mass production.

SUMMARY OF THE INVENTION

According to the present invention there is provided a water heater comprising a hot plate, the hot plate having first and second spaced surfaces extending substantially parallel to one another and a peripheral surface, an electrical resistance heater arranged to heat said plate, a cavity formed within said plate, said cavity extending in a direction substantially parallel to said first and second surfaces and having a closed end located within said plate and an open end forming an opening located in the peripheral surface of the plate, and a partition arranged within the cavity and extending from the open end thereof towards said closed end, the partition dividing the cavity transversely and defining within the cavity a substantially U-shaped passage forming a circulation passage for water to be heated.

The water heater of the invention does not require a gasket of large diameter. Furthermore, the plate and the cavity may be simply formed by casting a pocket in a single piece of cast metal.

BRIEF DESCRIPTION OF THE DRAWINGS

An embodiment of the present invention will hereinafter be described, by way of example, with reference to the accompanying drawings, in which:

FIG. 2 shows, on a larger scale, a horizontal section of this water heater;

FIG. 3 is a vertical section of the hot plate forming part of this water heater, taken along the line III—III of FIG. 2;

FIG. 4 shows in elevation, on a smaller scale, the partition inserted in the cavity of the hot plate in order to form the circulation passage; and FIG. 5 is a vertical section of this partition, but on a larger scale.

DESCRIPTION OF A PREFERRED EMBODIMENT

Figure 1:
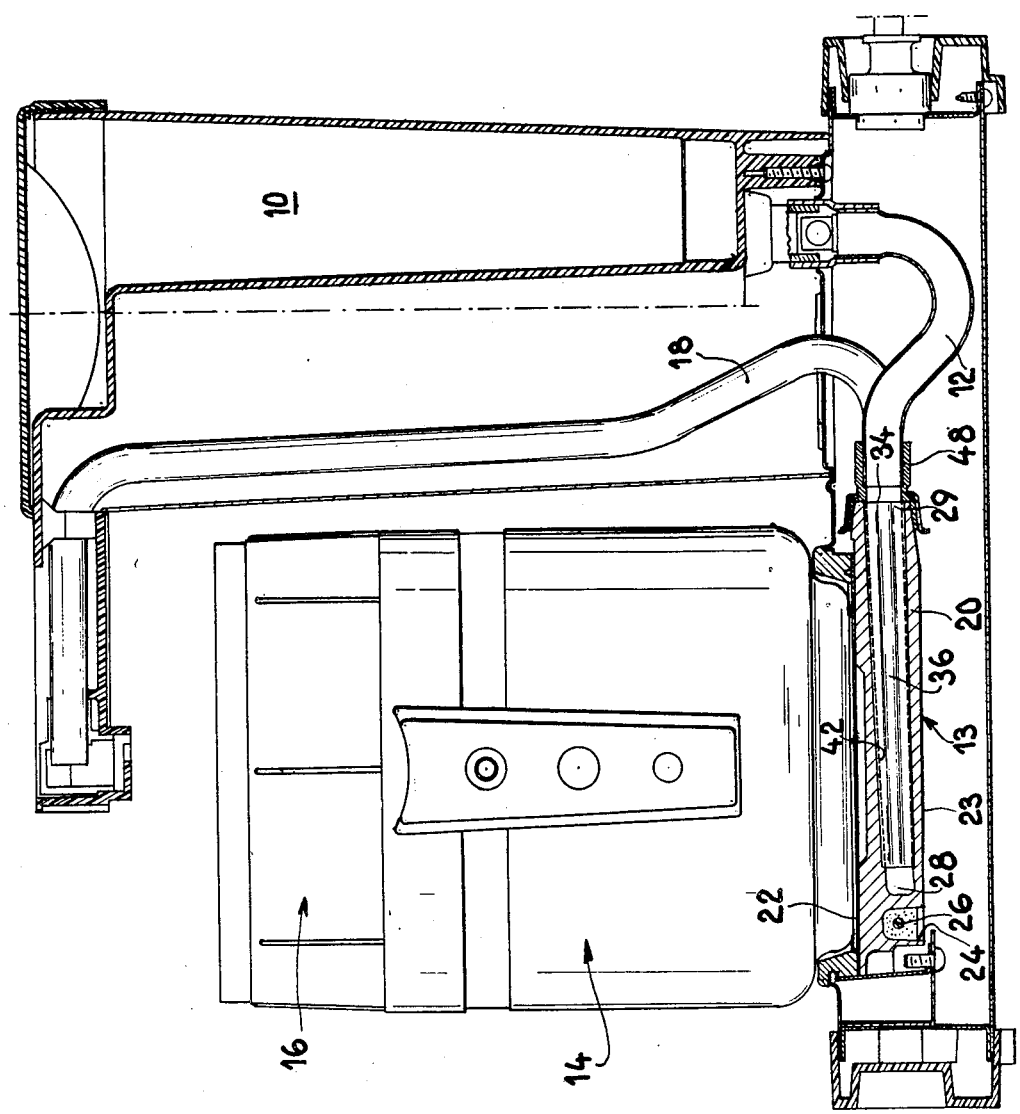
FIG. 1 shows a vertical section of a coffee maker in which a water heater of the present invention is incorporated.

The coffee maker shown in FIG. 1 comprises a cold water reservoir 10 for supplying water via a tube 12 to a water heater 13, and a container 14 for collecting the infusion. The container 14 is surmounted by a filter 16 into which water heated by the water heater 13 flows by way of a tube 18. The water heater 13 comprises a hot plate 20, of overall circular shape, which is made by casting aluminum. This plate 20 is mounted horizontally in the coffee maker. The upper face 22 of the plate 20 provides a support for the collecting container 14 and keeps the container 14 warm, whilst the lower face 23 of the plate 20 possesses a U-shaped groove 24 in which an electrical heating resistance 26 is housed. In its interior, the plate possesses, in the space bounded by the U-shaped groove 24, a water circulation passage 28 which extends from a cold water inlet orifice 29, in communication with the tube 12, to a hot water outlet orifice 30, in communication with the tube 18.

A flattened cavity 32, in the form of a pocket, is made in the plate 20 and extends from an oblong opening 34 located on the peripheral face 35 of this plate, in a direction parallel to the upper and lower faces 22 and 23. A partition 36, is inserted in this cavity 32 transversely of the opening 34, and extends from this opening 34 towards the interior, defining together with the internal walls of the cavity, a U-shaped free space which extends round the free end 37 of the partition 36 and which constitutes the circulation passage 28. The cavity 32 has an external profile of parabolic shape, and the width and the depth of the opening 34 are respectively greater than the width and the depth of the section of the cavity near its closed end. This enables the plate 20 to be successfully mass produced by casting.

As seen more clearly in FIGS. 4 and 5, the partition 36 is formed by a metal strip which is inserted by sliding, from the opening 34, in two grooves 38 and 40 (FIG. 3) made respectively in the upper wall 42 and lower wall 44 of the cavity 32. So that the strip 36 is held in the grooves 38 and 40 in a comparatively leaktight manner, this strip has a section provided with an undulation 46 (FIG. 5) which ensures that the strip has a degree of transverse elasticity.

To ensure a satisfactory discharge of the hot water from the circulation passage 28, the upper internal wall 42 of the cavity 32 is inclined upwardly from the closed end of the cavity to the opening 34 (FIG. 1).

In order to connect the cold water inlet orifice 29 to the tube 12 and the hot water outlet orifice 30 to the tube 18, a connecting plug 48 made of a flexible material which withstands high temperatures, such as silicone, is provided. This plug 48 is applied in a leaktight manner to the circumference of the opening 34, and also to the adjacent end of the partition 36. The plug 48 has two passages 50 and 52 which are arranged to extend on either side of the partition 36 and are arranged to receive the tubes 12 and 18 respectively.

I claim:

1. A water heater comprising a horizontally supported hot plate made in a single piece by casting metal and having upper and lower spaced faces extending substantially parallel to one another and a peripheral face, an electrical resistance arranged to heat said plate, a flattened cavity formed within said plate and having the shape of a pocket extending in a direction substantially parallel to the upper and lower faces from an oblong open end located on said peripheral face to a closed end located within the plate, said cavity having integral substantially planar upper and lower internal walls and a peripheral wall of generally parabolic shape with the horizontal width of the open end greater than the horizontal width of the section of the cavity near its closed end, and a partition inserted in the cavity between the upper and lower walls thereof transversely of the open end and extending from said open end towards said closed end, said partition defining together with the walls of the cavity a substantially U-shaped free space which extends around the internal free end of said partition and which constitutes within the cavity a circulation passage for water to be heated.

2. A water heater according to claim 1, wherein the partition is formed by a metal strip having two longitudinal edges which are slidably received in grooves formed respectively in the upper and lower walls of the cavity, said strip having a transverse section having an undulation that imparts transverse elasticity to the strip.

3. A water heater according to claim 1, further comprising a single connecting plug having two passages arranged to receive respectively two tubes for water, said plug being applied in a fluid tight manner to the periphery of the oblong open end and to the adjacent end of the partition, said adjacent end being located between said two passages.

* * * * *